(12) United States Patent
Ohtani et al.

(10) Patent No.: US 9,110,887 B2
(45) Date of Patent: Aug. 18, 2015

(54) SPEECH SYNTHESIS APPARATUS, SPEECH SYNTHESIS METHOD, SPEECH SYNTHESIS PROGRAM PRODUCT, AND LEARNING APPARATUS

(71) Applicant: KABUSHIKI KAISHA TOSHIBA, Minato-ku, Tokyo (JP)

(72) Inventors: Yamato Ohtani, Fuchu (JP); Masatsune Tamura, Kawasaki (JP); Masahiro Morita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 280 days.

(21) Appl. No.: 13/727,011

(22) Filed: Dec. 26, 2012

(65) Prior Publication Data

US 2013/0262087 A1    Oct. 3, 2013

(30) Foreign Application Priority Data

Mar. 29, 2012    (JP) ................................. 2012-075967

(51) Int. Cl.
G06F 17/27    (2006.01)
G06F 17/28    (2006.01)
G10L 13/02    (2013.01)

(52) U.S. Cl.
CPC ................ *G06F 17/28* (2013.01); *G10L 13/02* (2013.01)

(58) Field of Classification Search
CPC . G06F 17/27; G06F 17/2705; G06F 17/2715; G06F 13/00; G06F 13/02; G06F 13/027; G06F 13/04; G06F 13/043; G06F 13/047; G06F 13/06; G06F 13/08; G06F 13/1308
USPC ...................... 704/9, 258, 260, 261, 264, 266
See application file for complete search history.

(56) References Cited

U.S. PATENT DOCUMENTS 8,244,534 B2 *    8/2012    Qian et al. .................. 704/256.3
2003/0163320 A1 *    8/2003    Yamazaki et al. ............ 704/270

(Continued)

FOREIGN PATENT DOCUMENTS

JP    2004-012584 A    1/2004
JP    3732793 B2    1/2006

(Continued)

OTHER PUBLICATIONS

Office Action mailed on Jun. 17, 2014 in corresponding JP application No. 2012-075967 (with English translation).

(Continued)

*Primary Examiner* — Qi Han
(74) *Attorney, Agent, or Firm* — Posz Law Group, PLC

(57) ABSTRACT

According to one embodiment, a speech synthesis apparatus includes a language analyzer, statistical model storage, model selector, parameter generator, basis model storage, and filter processor. The language analyzer analyzes text data and outputs language information data that represents linguistic information of the text data. The statistical model storage stores statistical models prepared by statistically modeling acoustic information included in speech. The model selector selects a statistical model from the models based on the language information data. The parameter generator generates speech parameter sequences using the statistical model selected by the model selector. The basis model storage stores a basis model including basis vectors, each of which expresses speech information for each limited frequency range. The filter processor outputs synthetic speech by executing filter processing of the speech parameter sequences and the basis model.

15 Claims, 5 Drawing Sheets

(56) References Cited

U.S. PATENT DOCUMENTS

| | | | |
|---|---|---|---|
| 2003/0191645 A1* | 10/2003 | Zhou | 704/260 |
| 2006/0229877 A1* | 10/2006 | Tian et al. | 704/267 |
| 2009/0144053 A1 | 6/2009 | Tamura et al. | |
| 2012/0053933 A1 | 3/2012 | Tamura et al. | |

FOREIGN PATENT DOCUMENTS

| | | |
|---|---|---|
| JP | 2009139406 A | 6/2009 |
| JP | 2012-058293 A | 3/2012 |

OTHER PUBLICATIONS

K. Tokuda, "Recent Advances in Statistical Parametric Speech Synthesis", Acoustical Science & Technology, Dec. 2010, vol. 67, No. 1, pp. 17-22.

Keiichi Tokuda et al., "Speech Parameter Generation Algorithms for HMM-Based Speech Synthesis", Proc. in ICASSP, pp. 1315-1318 (2000).

Background Art Information Sheet provided by Applicants, Jul. 4, 2012 (1 page total).

* cited by examiner

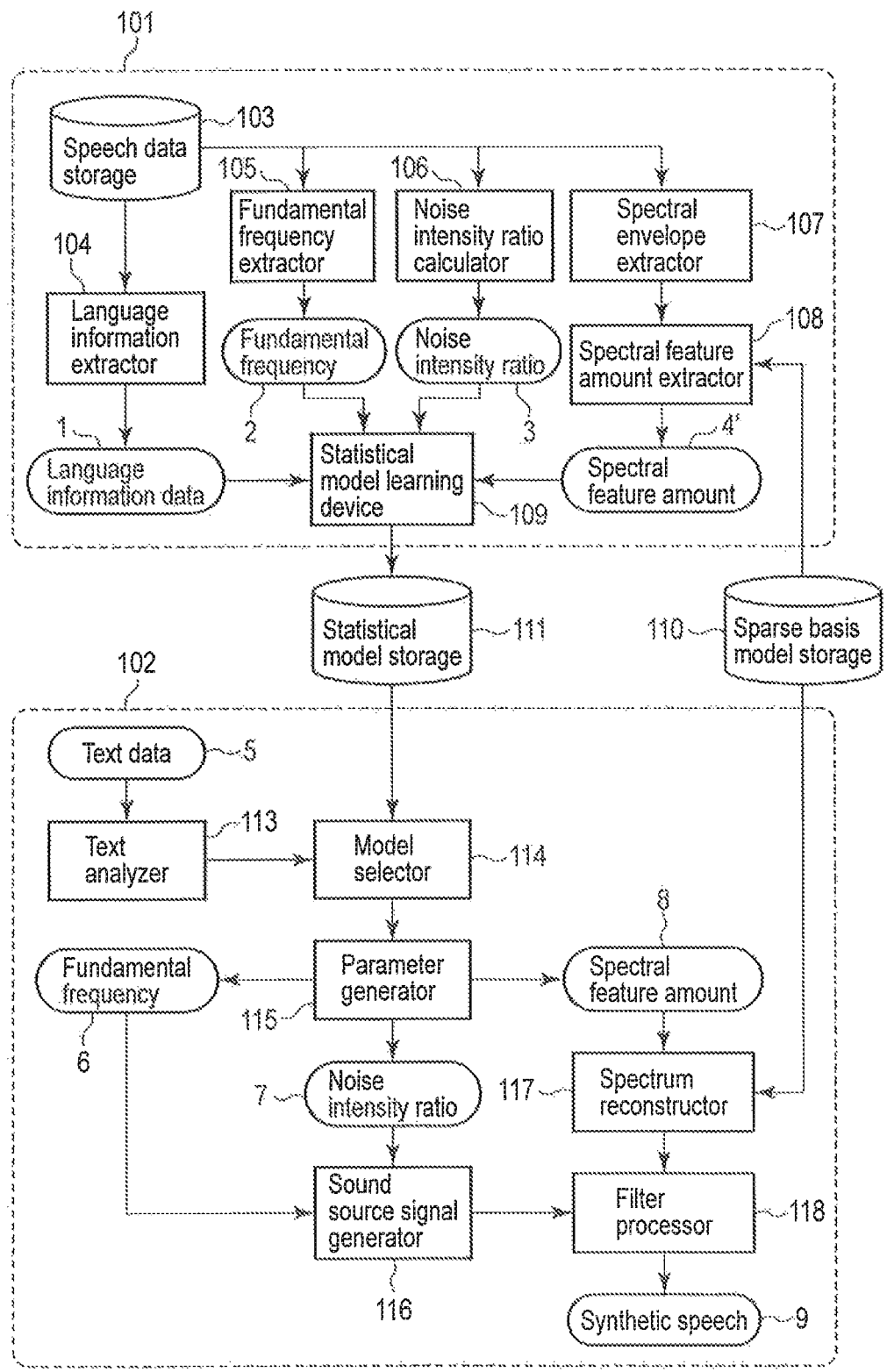
F I G. 1

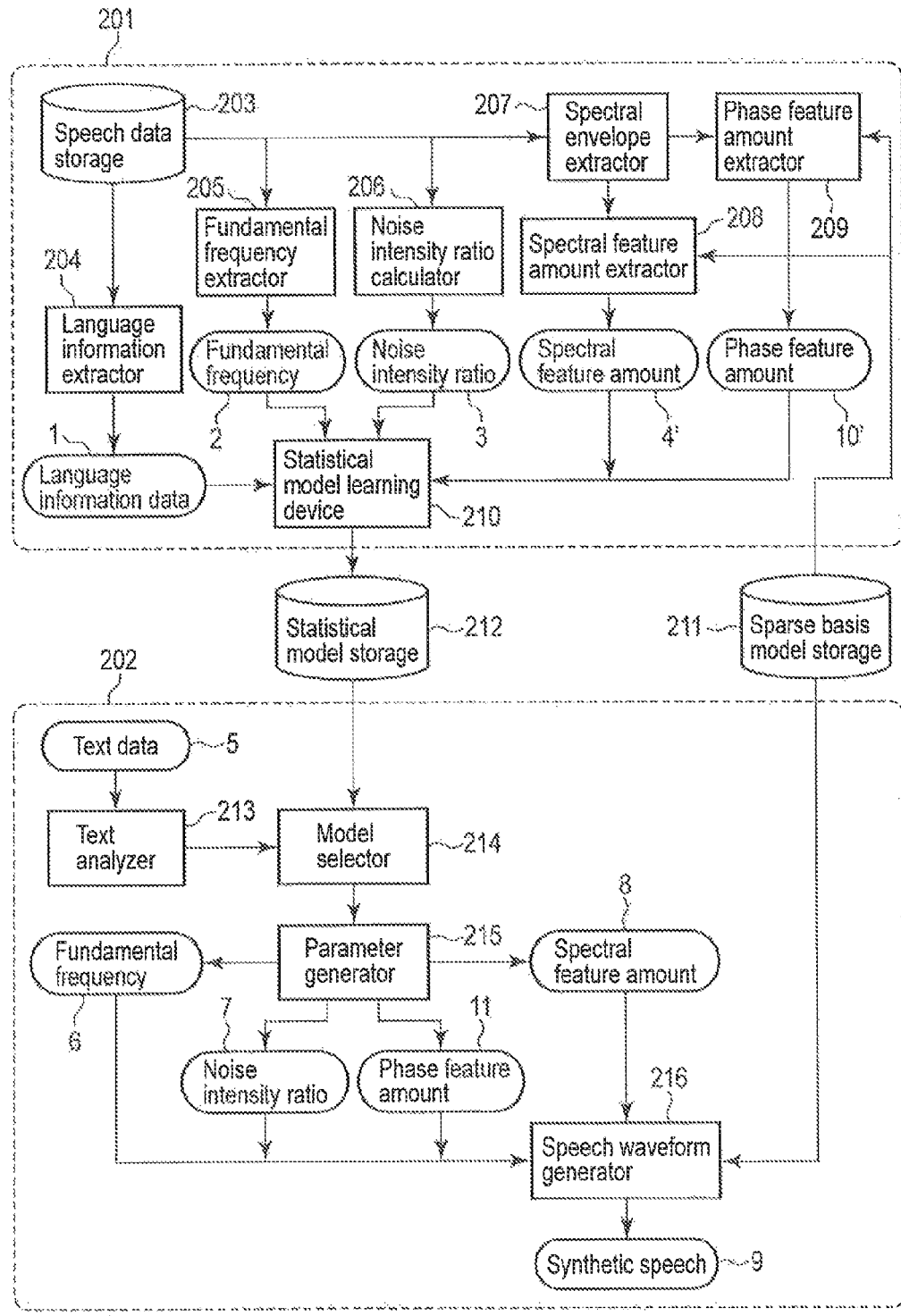
F I G. 3

SPEECH SYNTHESIS APPARATUS, SPEECH SYNTHESIS METHOD, SPEECH SYNTHESIS PROGRAM PRODUCT, AND LEARNING APPARATUS

CROSS-REFERENCE TO RELATED APPLICATIONS

This application is based upon and claims the benefit of priority from Japanese Patent Application No. 2012-075967, filed Mar. 29, 2012, the entire contents of which are incorporated herein by reference.

FIELD

Embodiments described herein relate generally to a speech synthesis apparatus, speech synthesis method, speech synthesis program product, and learning apparatus.

BACKGROUND

Quality of synthetic speech based on a statistical model depends on that of speech parameters used to construct the statistical model. The speech parameters having the relatively small number of dimensions are required to be used to construct the statistical model.

BRIEF DESCRIPTION OF THE DRAWINGS

FIG. 1 is a block diagram showing a speech synthesis apparatus according to the first embodiment;

FIG. 3 is a block diagram showing a speech synthesis apparatus according to the second embodiment;

DETAILED DESCRIPTION

Figure 2:
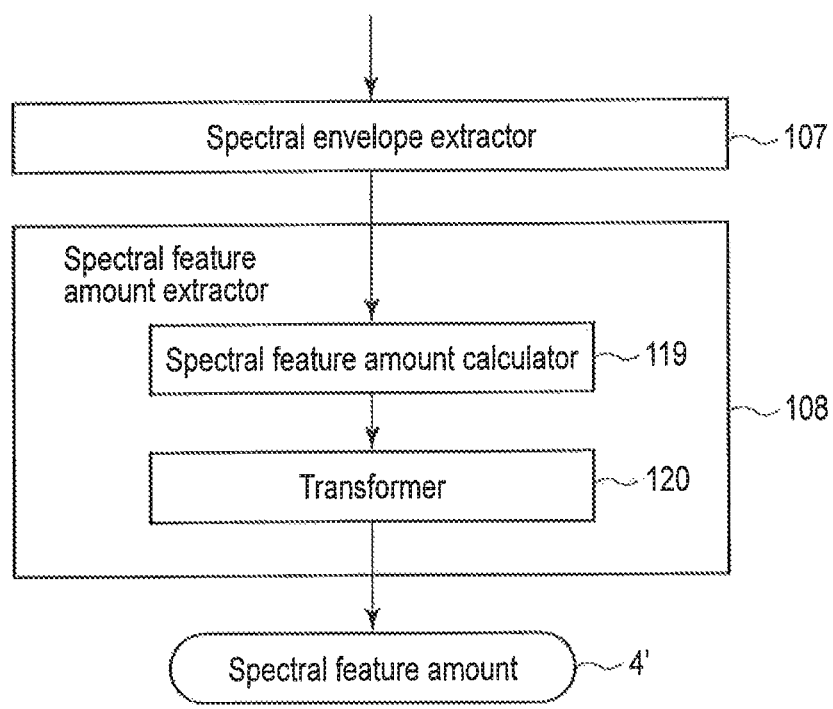
FIG. 2 is a block diagram showing a spectral feature amount extractor according to the first embodiment.

In general, according to one embodiment, a speech synthesis apparatus includes a language analyzer, statistical model storage, model selector, parameter generator, basis model storage, and filter processor.

The language analyzer is configured to analyze text data and output language information data that represents linguistic information of the text data. The statistical model storage is configured to store a plurality of statistical models prepared by statistically modeling acoustic information included in speech. The model selector is configured to select a statistical model from the plurality of statistical models based on the language information data. The parameter generator is configured to generate a plurality of speech parameter sequences using the statistical model selected by the model selector. The basis model storage is configured to store a basis model including a plurality of basis vectors, each of which expresses speech information for each limited frequency range. The filter processor is configured to output synthetic speech by executing filter processing of the plurality of speech parameter sequences and the basis model. Any of the plurality of speech parameter sequences represents weights to be applied to the basis vectors upon linearly combining the plurality of basis vectors.

First Embodiment

FIG. 1 is a block diagram showing a speech synthesis apparatus using a statistical model according to the first embodiment. This speech synthesis apparatus includes a dictionary learning device 101 which learns offline a statistical model as a synthesis dictionary required to generate synthetic speech and a speech synthesizer 102 which generates online an arbitrary speech waveform using the synthesis dictionary generated by the dictionary learning device 101. In this specification, learning of the statistical model by the dictionary learning device 101 will be explained first, and speech synthesis processing by the speech synthesizer 102 will then be described.

Learning of the statistical model will be described first.

The dictionary learning device 101 includes a speech data storage 103, language information extractor 104, fundamental frequency extractor 105, noise intensity ratio calculator 106, spectral envelope extractor 107, spectral feature amount extractor 108, and statistical model learning device 109.

The speech data storage 103 stores speech data required to learn the statistical model used as the synthesis dictionary. More specifically, the speech data include a plurality of speech waveform data uttered by a speaker, and text data corresponding to these speech waveform data. The text data may include that in which kanji, kana, alphanumeric letters, symbols, and the like corresponding to arbitrary speech waveform data are mixed, and that including information of an utterance method of a speaker expressed by speech waveform data, that is, information such as a phonologic sequence, accents, pause positions, pause lengths, and so forth at the time of utterance.

The language information extractor 104 extracts linguistic information by analyzing the text data held in the speech data storage 103. More specifically, the language information extractor 104 extracts phonemes, phrase end positions, sentence lengths, breath group lengths, breath group positions, accent phrase lengths, accent phrase positions, word lengths, word positions, morn lengths, more positions, accent types, modification information, grammar information, information associated with preceding features, next preceding features, succeeding features, and next succeeding features, phoneme boundary information, and the like, and outputs language information data 1.

The fundamental frequency extractor 105 extracts a fundamental frequency sequence (to be referred to as "F0 sequence" hereinafter) 2 included in speech data held in the speech data storage 103. One generates a sound source by vibrating a voice cord, and produces speech via a space called a vocal tract formed from a throat to lips of the mouth. The F0 sequence 2 is information of the number of times of vibrations (frequency) per short—time segment (frame). Assume that this embodiment uses a natural log value obtained by converting the extracted F0 sequence 2 and time variation information of the log F0.

The noise intensity ratio calculator 106 calculates degrees of periodicity and non-periodicity for each frequency band in a short-time segment from speech data held in the speech data storage 103. In this embodiment, time change amounts 3 of noise intensity ratios are also calculated.

The spectral envelope extractor 107 extracts a short-time spectral envelope from speech data held in the speech data storage 103. A spectral envelope includes feature amounts which represent transfer characteristics such as amplitude characteristics and phase characteristics at respective frequencies of the vocal tract formed from the throat to the lips of the mouth. Various phonemes and vocal sounds can be expressed when the transfer characteristics change in a time direction. This embodiment uses only the amplitude characteristics in the spectral envelope, and uses a log amplitude spectrum obtained by converting the amplitude characteristics into a natural log.

The spectral feature amount extractor 108 extracts spectral feature amounts 4 from the spectral envelope of the log amplitude spectrum extracted by the spectrum envelope extractor 107 using a basis model held in a sparse basis model storage 110. The basis model expresses information for each limited frequency range of speech.

This embodiment uses a Sparse Basis model (to be abbreviated as "SBM" hereinafter) to extract the spectral feature amounts 4. The SBM is a basis model having a plurality of spatially sparse bases. As such SBM, a basis model may be used. The basis model has the following features.

(1) Basis vectors in the SBM have values in a predetermined frequency range including a peak frequency which gives a single maximum value on a frequency axis, assume zero (or a negligible value upon calculation) as a value outside the frequency range, and do not have a plurality of identical maximum values unlike periodic bases used in Fourier transformation or cosine transformation. In this way, the frequency range of the bases of the SBM is limited, and these bases do not have a plurality of identical maximum values unlike periodic bases. At this point, these bases are different from those used in cepstrum analysis.

(2) The number of basis vectors included in the basis model is smaller than the number of analysis points (the number of analysis points used to analyze a quantized speech waveform signal) included in the spectral envelope, and that number is less than a half of the number of analysis points.

(3) Two bases corresponding to neighboring peak frequency positions overlap each other. That is, frequency ranges including values of two bases corresponding to neighboring peak frequencies overlap each other.

The basis vector of the SBM is defined, for example, by $$\phi_n(k) = \begin{cases} 0.5 - 0.5\cos\left(\frac{k - \tilde{\Omega}(n-1)}{\tilde{\Omega}(n) - \tilde{\Omega}(n-1)}\pi\right) & (\tilde{\Omega}(n-1) \le k < \tilde{\Omega}(n)) \\ 0.5 - 0.5\cos\left(\frac{k - \tilde{\Omega}n}{\tilde{\Omega}(n+1) - \tilde{\Omega}(n)}\pi + \frac{\pi}{2}\right) & (\tilde{\Omega}(n) \le k < \tilde{\Omega}(n+1)) \\ 0 & \text{otherwise} \end{cases} \quad (1)$$

where $\phi_n(k)$ is a k-th component of an n-th basis vector, and $\Omega(n)$ [rad] is a peak frequency of the n-th basis vector, which is defined by:

$$\tilde{\Omega}(n) = \begin{cases} \Omega + 2\tan^{-1}\frac{\alpha\sin\Omega}{1 - \alpha\cos\Omega} & (0 \le n < N_w) \\ \frac{n - N_w}{N - N_w}\pi + \frac{\pi}{2} & (N_w \le n < N) \end{cases} \quad (2)$$

where $\alpha$ is an elasticity coefficient, $\Omega$ is a frequency [rad], and $N_\omega$ is a value which satisfies $\Omega(N_\omega) = \pi/2$ [rad].

The SBM can express a log amplitude spectrum x(k) by a linear combination of weighted basis vectors having the aforementioned features, as described by:

$$x(k) = \sum_{n=0}^{N-1} \phi_n(k)c_n \quad (3)$$

where $c_n$ is a weight for each basis vector of the SBM.

In this embodiment, the weights $c_n$ of the respective basis vectors of the SBM are the spectral feature amounts 4. The spectral feature amounts 4 may be extracted using a nonnegative least square method. That is, the weights $c_n$ of the respective basis vectors are optimized to minimize errors between the linear combination of the respective weighted basis vectors of the SBM and the log amplitude spectrum. In this case, the optimization is done under the restriction that values of the spectral feature amounts 4 are always zero or more.

In this embodiment, the number of bases of the SBM is, for example, 50. As for low-frequency range bases from zero rad to π/2 rad, first to 34th bases use those which are generated using a mel scale based on an elasticity coefficient value (0.35 in this case) of an all-pass filter used in mel-cepstrum analysis. As for a high-frequency range from π/2 rad to π rad, 35th to 50th bases use those generated using a linear scale so as to enhance the frequency resolution of the high-frequency range.

Note that scales other than the mel scale may be used for the low-frequency range bases of the SBM. For example, a linear scale, Bark scale, ERE (Equivalent Rectangular Bandwidth) scale, and the like may be used.

Also, the bases of the SBM may be automatically determined using a sparse coding method.

FIG. 2 is a block diagram showing an arrangement example of the spectral feature amount extractor 108 according to the first embodiment. The spectral feature amount extractor 108 has a spectral feature amount calculator 119 and transformer 120. The spectral feature amount calculator 119 calculates the spectral feature amounts 4 from the spectral envelope (log amplitude spectral envelope in this case) extracted by the spectral envelope extractor 107. The spectral feature amounts 4 obtained by this calculator may be introduced to the statistical model learning device 109. However, when these spectral feature amounts 4 are used intact, learning cannot often be appropriately executed. Hence, this embodiment applies transformation processing to the spectral feature amounts 4 to be easily handled in the statistical model learning. More specifically, the transformer 120 applies transformation processing to the spectral feature amounts 4 calculated by the spectral feature amount calculator 119 and outputs spectral feature amounts 4'. As the transformation processing method by the transformer 120, orthogonal transformation such as discrete Fourier transformation, discrete sine transformation, or discrete cosine transformation can be used. It is preferable to use discrete cosine transformation, modified discrete cosine transformation, or fast cosine transformation.

When discrete cosine transformation (DCT-II) is used as the transformation processing method by the transformer 120, $C_m$ corresponding to the spectral feature amounts 4', which are transformed to be applied to statistical model learning, are expressed by:

$$C_m = \sum_{n=0}^{N-1} c_n \cos\left\{\frac{\pi}{N}\left(n + \frac{1}{2}\right)m\right\} \quad (4)$$

The spectral feature amounts 4' expressed by the above equation are passed to the statistical model learning device 109 and are used in the statistical model learning. According to the aforementioned transformation, correlations between spectral feature amounts can be decreased averagely, thus allowing appropriate learning of the statistical model.

The statistical model learning device 109 learns the statistical model using the language information data 1 obtained by the language information extractor 104, the F0 sequence (fundamental frequencies) 2 obtained by the fundamental frequency extractor 105, the noise intensity ratios 3 obtained by the noise intensity ratio extractor 106, and the spectral feature amounts 4' obtained by the spectral feature amount extractor 108.

The learned statistical model is held by a statistical model storage 111. As the statistical model, a hidden Markov model or hidden semi-Markov model may be used. Note that as the statistical model, a contaminated normal distribution model, conditional random field, or the like may be used in addition to the aforementioned hidden Markov model.

Speech synthesis processing by the speech synthesizer 102 will be described below.

As shown in FIG. 1, the speech synthesizer 102 includes a text analyzer 113, model selector 114, parameter generator 115, sound source signal generator 116, spectrum reconstructor 117, and filter processor 118.

The text analyzer US analyzes input arbitrary text data 5 to extract language information data. More specifically, the text analyzer 113 extracts phonemes, phrase end positions, sentence lengths, breath group lengths, breath group positions, accent phrase lengths, accent phrase positions, word lengths, word positions, more lengths, mora positions, accent types, modification information, grammar information, information associated with preceding features, next preceding features, succeeding features, and next succeeding features, and the like. As the text data 5 which can be input to the text analyzer 113, text data in which the user arbitrarily determines a sentence reading method, that is, a phonologic sequence, accent positions, pause positions, pause lengths, and the like, may be input in addition to plain text data.

The model selector 114 selects a statistical model most suitable for the language information data obtained by the text analyzer 113 from the statistical model storage 111. The parameter generator 115 generates a plurality of speech parameter sequences, that is, a fundamental frequency sequence 6, noise intensity ratio sequence 7, and spectral feature amount sequence 8 using the statistical model selected by the model selector 114.

As the parameter generation method used in this embodiment, respective speech feature amount sequences may be generated sentence by sentence using respective speech feature amounts, and average information and derivative information of time variation amounts included in the statistical model. In addition, feature amount sequences may be recursively calculated using respective speech feature amounts, and average information and derivative information of time variation amounts included in the statistical model. Alternatively, an average information sequence of speech feature amounts may be output intact, and information obtained by applying interpolation processing such as piecewise linear interpolation or spline interpolation to respective pieces of average information may be output.

It is desired to improve quality by executing parameter emphasis processing upon generation of parameters.

The sound source signal generator 116 generates a sound source signal using the fundamental frequency sequence 6 and noise intensity ratio sequence 7 generated by the parameter generator 115. As a practical sound source signal generation method, a pulse signal sequence and noise signal sequence are generated based on the fundamental frequency sequence 6. Next, the noise signal sequence and pulse signal sequence are weighted and added to generate a sound source signal. As weight information required to weight and add these sequences, weight information generated based on the noise intensity ratio sequence 7 is used.

The spectrum reconstructor 117 reconstructs a spectral envelope using a basis model held in the sparse basis model storage 110 from the spectral feature amount sequence 8 generated by the parameter generator 115. This embodiment uses the SBM (Sparse Basis model). The log amplitude spectral envelope can be reconstructed by weighting basis vectors of the SBM by the spectral feature amounts 4 and linearly combining them. Especially, this embodiment uses the spectral feature amounts 4' ($C_m$) obtained by transforming the spectral feature amounts 4 by the discrete cosine transformation. For this reason, the spectrum reconstructor 117 transforms the spectral feature amounts 4' into the spectral feature amounts 4 of the SBM by inverse discrete cosine transformation given by:

$$c_n = \frac{C_0}{2} + \sum_{m=1}^{M-1} C_m \cos\left\{\frac{\pi}{M}m\left(n + \frac{1}{2}\right)\right\} \quad (5)$$

Then, the spectrum reconstructor 117 executes linear combination given by equation ( ) thereby reconstructing the log amplitude spectral envelope.

The filter processor 118 generates synthetic speech 9 by convoluting the sound source signal obtained by the sound source signal generator 116 and the log amplitude spectrum envelope sequence obtained by the spectrum reconstructor 117.

Note that the sound source signal generator 116, spectrum reconstructor 117, and filter processor 118 can sequentially execute processing by inputting respective speech feature amount sequences frame by frame.

According to the aforementioned embodiment, speech parameters extracted using a basis model which expresses information for each limited frequency range of speech are applied to speech synthesis based on the statistical model, thereby improving quality of synthetic speech. In this embodiment, the spectral feature amounts based on the SBM (parameters of a log amplitude spectral envelope) are used in learning of the statistical model learning device 109. The spectral feature amounts are extracted by the spectral feature amount extractor 108 using the SBM held in the sparse basis model (SBM) storage 110. Especially, in this embodiment, the transformer 120 applies the discrete cosine transformation to the spectral feature amounts so as to transform them to the spectral feature amounts suitable for learning of the statistical model.

Note that this embodiment uses the SBM. However, in place of the SBM, a basis model having bases obtained by nonnegative value matrix factorization or spatially sparse bases like a formant waveform (FWF) model may be used. In this case, the FWF model is a model which expresses a speech waveform by window functions that express some peak shapes (formants) included in spectral envelopes and by the linear combination with sine waves prepared as many as the number of window functions. Since the window functions which express formants of spectral envelopes have characteristics in which they have values in a limited frequency range on the frequency axis, and assume zero in other frequency ranges, they can be handled as a sparse basis model in the same manner as the SBM. Such model can be used in this embodiment and the second embodiment to be described below.

Second Embodiment

FIG. 3 is a block diagram showing a speech synthesis apparatus according to the second embodiment. As in the first embodiment, this speech synthesis apparatus includes a dictionary learning device 201 which learns offline a statistical model as a synthesis dictionary required to generate synthetic speech, and a speech synthesizer 202 which generates online an arbitrary speech waveform using the synthesis dictionary generated by the dictionary learning device 201.

The aforementioned first embodiment uses the spectral feature amounts 4' in learning of the statistical model based on the SBM and speech synthesis. By contrast, the second embodiment uses not only the spectral feature amounts 4' but also phase feature amounts.

Learning of the statistical model by the dictionary learning device 201 will be described first, and speech synthesis processing by the speech synthesizer 202 will then be described.

Learning of the statistical model will be described first.

The dictionary learning device 201 includes a speech data storage 203, language information extractor 204, fundamental frequency extractor 205, noise intensity ratio calculator 206, spectral envelope extractor 207, spectral feature amount extractor 208, phase feature amount extractor 209, and statistical model learning device 210.

The speech data storage 203 stores speech data required to learn the statistical model used as the synthesis dictionary. A practical example of the speech data is the same as that in the first embodiment. The language information extractor 204 extracts linguistic information by analyzing text data held in the speech data storage 203. A practical example of language information data is the same as that in the first embodiment.

As in the first embodiment, the fundamental frequency extractor 205 extracts a fundamental frequency sequence ("F0 sequence") 2, and the noise intensity ratio calculator 206 calculates time change amounts 3 of noise intensity ratios and the like.

The spectral envelope extractor 207 extracts a short-time spectral envelope from speech data as in the first embodiment. Especially, in this embodiment, the spectral envelope extractor 207 extracts not only a log amplitude spectrum but also a phase spectrum.

The spectral feature amount extractor 208 extracts spectral feature amounts 4' from the log amplitude spectral envelope extracted by the spectrum envelope extractor 207 using a basis model held in a sparse basis model storage 211. The extraction processing of the spectral feature amounts 4' is the same as that in the first embodiment.

Figure 4:
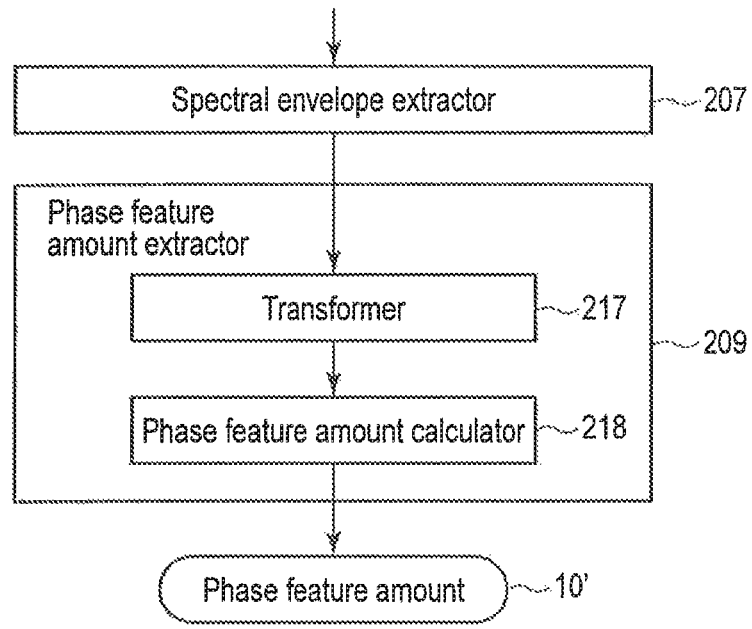
FIG. 4 is a block diagram showing a phase feature amount extractor according to the second embodiment.

FIG. 4 is a block diagram showing an arrangement example of the phase feature amount extractor 209 according to the second embodiment. The phase feature amount extractor 209 includes a transformer 217 and phase feature amount calculator 218. The transformer 217 transforms a phase spectrum, which is extracted by the spectral envelope extractor 207 and is expressed by polar coordinates, into a phase spectrum, which is expressed by orthogonal coordinates. The phase feature amount calculator 218 calculates phase feature amounts 10' from the phase spectrum, which is transformed into the orthogonal coordinate expression by the transformer 217. In this case, the phase feature amount calculator 218 extracts the phase feature amounts 10' using a basis model held in the sparse basis model storage 211.

In this embodiment, the transformer 217 is arranged to appropriately cope with an unwrapping problem of phase feature amounts.

A phase has an instability nature of $2\pi$. In numerical calculations, when a phase value changes within a range from $-\pi$ to $\pi$, values on the frequency axis are extracted in a fragmented state. For this reason, processing (unwrapping) for shifting a phase by an integer multiple of $2\pi$ so as to be continuously changed may be applied.

This embodiment focuses attention on the fact that phase delay characteristics cannot be precisely calculated even after such unwrapping. Also, it becomes difficult to handle a phase in such case in learning of the statistical model.

Hence, in this embodiment, an expression used on an angle is re-expressed as $$\xi(k)=[\cos\theta(k), \sin\theta(k)] \qquad (6)$$

The transformer 217 transforms a phase spectrum $\theta(k)$ expressed by polar coordinates into a phase spectrum $\xi(k)$ expressed by coordinates on a complex plane, that is, orthogonal coordinates. The phase spectrum $\xi(k)$ represents values on a unit circle on the complex plane. That is, the phase spectrum $\xi(k)$ assumes real numbers as cosine values, and imaginary values as sine values.

By adopting the orthogonal coordinate expression, the aforementioned unwrapping problem can be avoided. In addition, the phase spectrum can be transformed into a form which can be easily handled in learning of the statistical model.

The phase feature amount calculator 218 calculates the phase feature amounts 10' using the SBM from the phase spectrum, which is transformed into the orthogonal coordinate expression by the transformer 217. The calculations of the phase feature amounts 10' may use a nonnegative least square method as in the case of the log amplitude spectral envelope. That is, weights of basis vectors are optimized to minimize errors between the linear combination of the weighted basis vectors of the SBM and the phase spectral envelope.

Note that this embodiment handles phases as the orthogonal coordinate expressions. In addition, a group delay expression may be used.

The statistical model learning device 210 learns the statistical model using language information data 1 obtained by the language information extractor 204, the F0 sequence (fundamental frequencies) 2 obtained by the fundamental frequency extractor 205, the noise intensity ratios 3 obtained by the noise intensity ratio extractor 206, the spectral feature amounts 4' obtained by the spectral feature amount extractor 208, and the phase feature amounts 10' obtained by the phase feature amount extractor 209.

The learned statistical model is held by a statistical model storage 212. As the statistical model, a hidden Markov model or hidden semi-Markov model may be used. Note that as the statistical model, a contaminated normal distribution model, conditional random field, or the like may be used in addition to the aforementioned hidden Markov model.

Speech synthesis, processing by the speech synthesizer 202 will be described below.

As shown in FIG. 3, the speech synthesizer 202 includes a text analyzer 213, model selector 214, parameter generator 215, and speech waveform generator 216.

The text analyzer 213 analyzes input arbitrary text data 5 to extract language information data. A practical example of the language information data is the same as that in the first embodiment.

The model selector 214 selects a statistical model most suitable for the language information data obtained by the text analyzer 213 from the statistical model storage 211. The parameter generator 215 generates a plurality of speech parameter sequences, that is, a fundamental frequency sequence 6, noise intensity ratio sequence 7, spectral feature amount sequence 8, and phase feature amount sequence 11 using the statistical model selected by the model selector 214.

As the parameter generation method used in this embodiment, respective speech feature amount sequences may be generated sentence by sentence using respective speech feature amounts, and average information and derivative information of time variation amounts included in the statistical model. In addition, feature amount sequences may be recursively calculated using respective speech feature amounts, and average information and derivative information of time variation amounts included in the statistical model. Alternatively, an average information sequence of speech feature amounts may be output intact, and information obtained by applying interpolation processing such as piecewise linear interpolation or spline interpolation to respective pieces of average information may be output.

It is desired to improve Quality by executing parameter emphasis processing upon generation of parameters.

The speech waveform generator 216 generates synthetic speech 9 using the parameter sequences obtained by the parameter generator 215.

Figure 5:
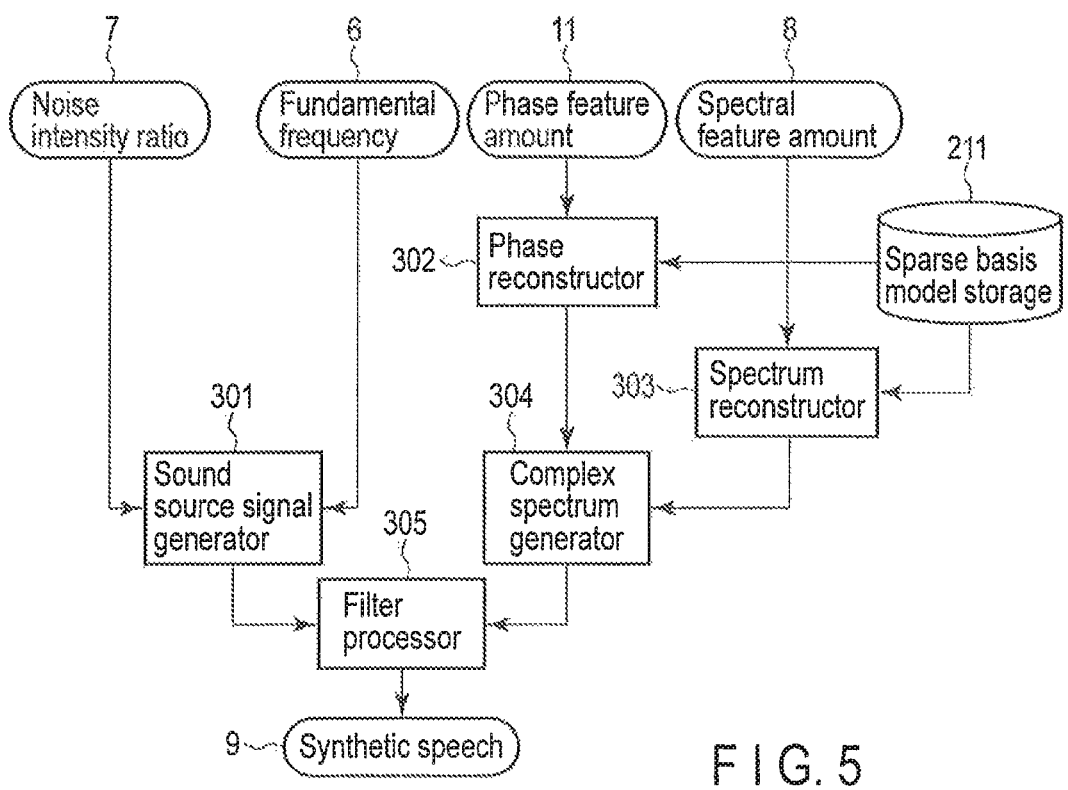
FIG. 5 is a block diagram showing a first arrangement example of a speech waveform generator according to the second embodiment.
Figure 6:
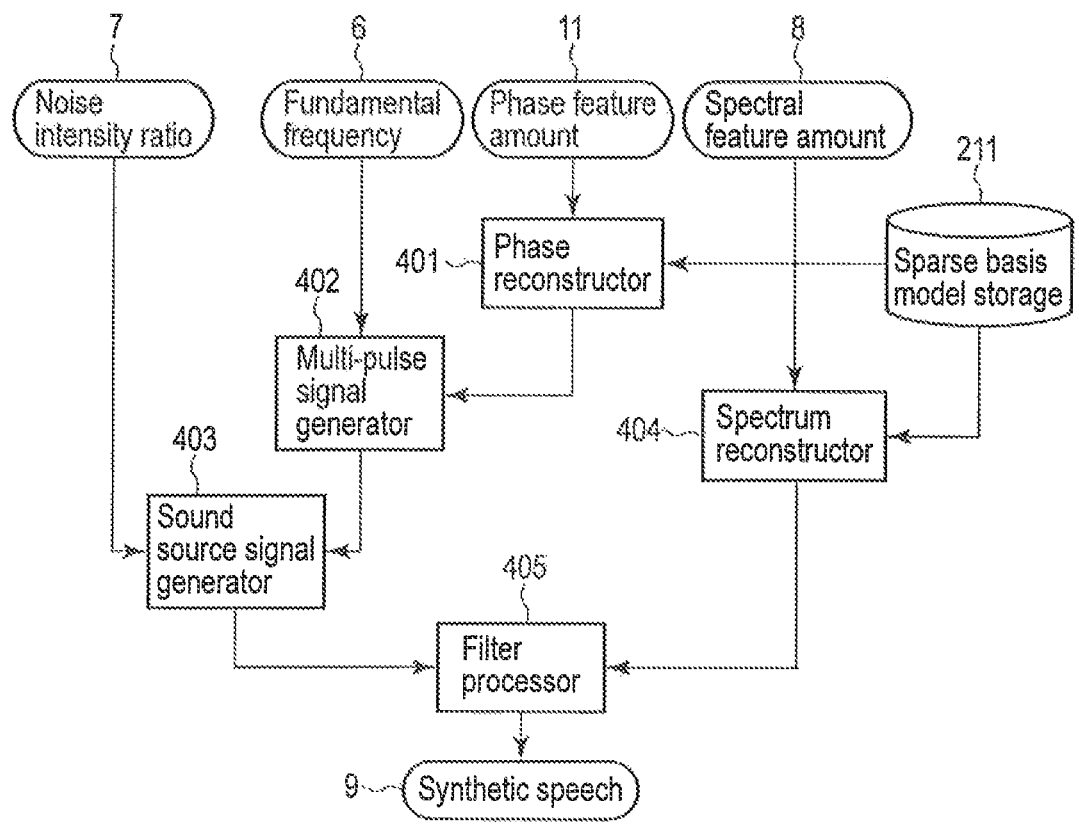
FIG. 6 is a block diagram showing a second arrangement example of the speech waveform generator according to the second embodiment.

FIGS. 5 and 6 show two arrangement examples of the speech waveform generator 216. Speech waveform generation methods in the respective arrangement examples shown in FIGS. 5 and 6 will be described below.

FIG. 5 is a block diagram showing a first arrangement example of the speech waveform generator 216.

A sound source signal generator 301 generates a pulse signal sequence and noise signal sequence based on the fundamental frequency information 6. Next, the sound source signal generator 301 weights and adds the noise signal sequence and pulse signal sequence based on information of the noise intensity ratio sequence 7, thus generating a sound source signal.

A phase reconstructor 302 applies the phase feature amounts 11 generated by the parameter generator 215 to equation (3) to restore a phase spectrum using the basis model held in the sparse basis model storage 211. This embodiment uses the SBM as a sparse basis model, and reconstructs the phase spectrum expressed by coordinates using the SBM linear combination. However, since absolute values of the reconstructed phase spectrum often do not exist on a unit circle, the phase spectrum is appropriately modified so that values of the phase spectrum exist on the unit circle.

A spectrum reconstructor 303 reconstructs a log amplitude spectrum using the spectral feature amount sequence 8 generated by the parameter generator 215, and the SBM held in the sparse basis model storage 211.

A complex spectrum generator 304 generates a complex spectrum from the phase spectrum and log amplitude spectrum obtained by the phase reconstructor 302 and spectrum reconstructor 303.

In this case, since the phase spectrum has coordinate expression on the complex number plane, the complex spectrum can be easily obtained by transforming the log amplitude spectrum into a linear-expressed amplitude spectrum, and by then multiplying real and imaginary part values of the phase spectrum.

A filter processor 305 generates synthetic speech 9 by convoluting the sound source signal obtained by the sound source signal generator 301 and the complex spectrum sequence obtained by the complex spectrum generator 304.

Note that the processes in the block diagram shown in FIG. 5 can be sequentially executed by inputting respective speech feature amount sequences frame by frame.

FIG. 6 is a block diagram showing the second arrangement example of the speech waveform generator 216.

A phase reconstructor 401 applies the phase feature amounts 11 generated by the parameter generator 215 to equation (3) to restore a phase spectrum using the basis model held in the sparse basis model storage 211. This embodiment uses the SBM as a sparse basis model, and reconstructs the phase spectrum expressed by coordinates using the SBM linear combination. However, since absolute values of the reconstructed phase spectrum often do not exist on a unit circle, the phase spectrum is appropriately modified so that values of the phase spectrum exist on the unit circle.

A multi-pulse signal generator 402 generates a multi-pulse signal sequence using the fundamental frequency sequence 6 and the phase spectrum reconstructed by the phase reconstructor 401. In this case, the multi-pulse signal generator 402 generates a pulse signal sequence based on the fundamental frequency information 6 first. Then, the multi-pulse signal generator 402 generates a multi-pulse signal sequence by multiplying the phase spectrum sequence and pulse signal sequence.

A sound source signal generator 403 generates a sound source signal using the multi-pulse signal sequence obtained by the multi-pulse signal generator 402 and the noise intensity ratio sequence 7. The sound source signal generator 403 generates a sound source signal by weighting and adding the multi-pulse signal sequence and noise signal sequence using weight information generated based on the information of the noise intensity ratio sequence 7.

A spectrum reconstructor 404 reconstructs a log amplitude spectrum using the spectral feature amount sequence 8 generated by the parameter generator 215 and the SBM held in the sparse basis model storage 211.

A filter processor 405 generates synthetic speech 9 by convoluting the sound source signal obtained by the sound source signal generator 403 and the amplitude spectrum sequence obtained by the spectrum reconstructor 404. Note that the processes in the block diagram shown in FIG. 6 can be sequentially executed by inputting respective speech feature amount sequences frame by frame.

The aforementioned speech synthesis apparatus may be implemented by installing the aforementioned program in a computer in advance, or by installing this program in a computer as needed by storing the program in a storage medium such as a CD-ROM or distributing the program via a network. The method described in this embodiment can be implemented using, as needed, a memory, hard disk, and storage media such as a CD-ROM, CD-RW, DVD-RAM, and DVD-R, which are incorporated in or externally connected to the computer apparatus.

According to the aforementioned embodiment, speech parameters extracted using a basis model that expresses information for each limited frequency range of speech is applied to speech synthesis based on a statistical model, thereby improving quality of synthetic speech. In this embodiment, spectral feature amounts (parameters of a log amplitude spectral envelope) based on the SBM are used in learning of the statistical model learning device 109. The spectral feature amounts are extracted by the spectral feature amount extractor 108 using the SBM held in the sparse basis model (SBM) storage 110. Especially, in this embodiment, the transformer 217 transforms a phase spectrum expressed by polar coordinates into that expressed by orthogonal coordinates, so as to appropriately cope with the phase unwrapping problem.

Some embodiments of the invention have been explained, but these embodiments are presented as examples and do not intend to limit the scope of the invention. These novel embodiments can be practiced in various other aspects, and can undergo various omissions, replacements, and changes without departing from the spirit of the invention. These embodiments and their modifications are included in the scope and spirit of the invention, and are included in the inventions described in the scope of the claims and their equivalent scopes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesis apparatus comprising:
    a statistical model storage configured to store a plurality of statistical models prepared by statistically modeling acoustic information included in speech;
    a basis model storage configured to store a basis model including a plurality of basis vectors, each of which expresses speech information for each limited frequency range; and
    a computer programmed to, based on instructions stored in a memory:
        analyze, by a language analyzer, text data and output language information data that represents linguistic information of the text data;
        select, by a model selector, a statistical model from the plurality of statistical models stored in the statistical model storage, based on the language information data output from the language analyzer;
        generate, by a parameter generator, a plurality of speech parameter sequences using the statistical model selected by the model selector;
        output, by a filter processor, synthetic speech by executing filter processing of the plurality of speech parameter sequences generated by the parameter generator and the basis model stored in the basis model storage,
    wherein any of the plurality of speech parameter sequences represents weights to be applied to the basis vectors upon linearly combining the plurality of basis vectors in the basis model in the basis model storage.

2. The apparatus according to claim 1, wherein the computer is further programmed to generate any of the plurality of speech parameter sequences from the statistical model which learns using spectral feature amounts obtained after transformation is applied to a plurality of spectral feature amounts extracted using the basis model so as to decrease correlations between the spectral feature amounts averagely.

3. The apparatus according to claim 1, wherein the computer is further programmed to generate any of the plurality of speech parameter sequences from the statistical model which learns using phase feature amounts obtained after a plurality of phase feature amounts expressed by polar coordinates for respective frequency ranges included in a speech signal, which amounts are extracted using the basis model, are transformed into phase feature amounts expressed by orthogonal coordinates.

4. The apparatus according to claim 1, wherein each of the plurality of basis vectors in the basis model stored in the basis model storage has a value in only a limited frequency range, and assumes zero or a negligible value upon calculation in a frequency range outside the limited frequency range.

5. The apparatus according to claim 1, wherein the number of the plurality of basis vectors in the basis model stored in the basis model storage is less than a half of the number of analysis points used upon analyzing a quantized speech waveform signal.

6. The apparatus according to claim 1, wherein each of the plurality of basis vectors in the basis model stored in the basis model storage has a peak at a frequency position based on a variable frequency scale for each frequency range.

7. The apparatus according to claim 1, wherein the speech parameter sequences have the same number of dimensions as the plurality of basis vectors included in the basis model in the basis model storage.

8. The apparatus according to claim 1, wherein the plurality of speech parameter sequences generated by the parameter generator are at least any of feature amounts which indicate a spectral envelope, feature amounts which indicate periodicity/non-periodicity of speech, and feature amounts which indicate phase characteristics of speech.

9. The apparatus according to claim 8, further wherein the computer is further programmed to reconstruct, by a spectrum reconstructor, a spectral envelope by linearly combining the feature amounts of the spectral envelope and the plurality of basis vectors included in the basis model stored in the basis model storage.

10. The apparatus according to claim 8, wherein the computer is further programmed to reconstruct, by a phase reconstructor, a phase spectrum by linearly combining the feature amounts indicating the phase characteristics and the plurality of basis vectors included in the basis model stored in the basis model storage.

11. The apparatus according to claim 10, wherein the computer is further programmed to generate, by a generator, a multi-pulse sound source signal from the phase spectrum.

12. The apparatus according to claim 1, wherein the computer is further programmed to learn, by a learning device, the statistical model using language information data based on speech data, and acoustic feature amounts extracted using the basis model based on the speech data.

13. A learning apparatus comprising the speech synthesis apparatus according to claim 1, wherein the computer is further programmed to
    learn the statistical model using language information data based on speech data and acoustic feature amounts extracted using the basis model based on the speech data, wherein the statistical model which is learned is then stored as one of the plurality of statistical models in the statistical model storage and used in the speech synthesis apparatus.

14. A speech synthesis method, implemented in a speech synthesis apparatus including a computer and a memory that are cooperatively operable with each other, comprising:
    analyzing, by the computer, text data;
    outputting, by the computer, language information data that represents linguistic information of the text data that is analyzed;

storing, by the computer, in a statistical model storage, a plurality of statistical models prepared by statistically modeling acoustic information included in speech;

selecting, by the computer, a statistical model from the plurality of statistical models stored in the statistical model storage based on the language information data that is output;

generating, by the computer, a plurality of speech parameter sequences using the selected statistical model from the statistical model storage;

storing, by the computer, in a basis model storage, a basis model including a plurality of basis vectors, each of which expresses speech information for each limited frequency range; and outputting, by the computer, synthetic speech by executing filter processing of the plurality of speech parameter sequences and the basis model in the basis model storage, wherein any of the plurality of speech parameter sequences represents weights to be applied to the basis vectors upon linearly combining the plurality of basis vectors in the basis model in the basis model storage.

15. A non-transitory, computer-readable medium with instructions stored thereon, which when executed by a computer, causes in the computer to:

analyze, by a language analyzer, text data and output language information data that represents linguistic information of the text data;

store, in a statistical model storage, a plurality of statistical models prepared by statistically modeling acoustic information included in speech;

select, by a model selector, a statistical model from the plurality of statistical models stored in the statistical model storage based on the language information data output from the language analyzer;

generate, by a parameter generator, a plurality of speech parameter sequences using the statistical model selected by the model selector;

store, in a basis model storage, a basis model including a plurality of basis vectors, each of which expresses speech information for each limited frequency range; and output, by a filter processor, synthetic speech by executing filter processing of the plurality of speech parameter sequences generated by the parameter generator and the basis model stored in the basis model storage, wherein any of the plurality of speech parameter sequences represents weights to be applied to the basis vectors upon linearly combining the plurality of basis vectors.

* * * * *